(12) United States Patent
Krone et al.

(10) Patent No.: US 10,694,717 B2
(45) Date of Patent: Jun. 30, 2020

(54) MILKING PARLOR ARRANGEMENT WITH AN INNER ROBOT DEVICE

(71) Applicant: GEA Farm Technologies GmbH, Bönen (DE)

(72) Inventors: Otto Krone, Ibbenbüren (DE); Olaf Suhr, Oelde (DE); Bernhard Schulze-Wartenhorst, Warendorf (DE); Erich Schneider, Ahlen (DE); Thomas Mader, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 14/384,678

(22) PCT Filed: Mar. 14, 2013

(86) PCT No.: PCT/EP2013/055265
§ 371 (c)(1),
(2) Date: Sep. 12, 2014

(87) PCT Pub. No.: WO2013/135829
PCT Pub. Date: Sep. 19, 2013

(65) Prior Publication Data
US 2015/0020739 A1    Jan. 22, 2015

(30) Foreign Application Priority Data
Mar. 14, 2012    (DE) .................. 10 2012 102 133

(51) Int. Cl.
*A01K 1/12*    (2006.01)
*A01J 5/017*    (2006.01)
(52) U.S. Cl.
CPC ............. *A01K 1/126* (2013.01); *A01J 5/0175* (2013.01)

(58) Field of Classification Search
CPC .. A01K 1/0005; A01K 1/0011; A01K 1/0035; A01K 1/0041; A01K 1/126;
(Continued)

(56) References Cited

U.S. PATENT DOCUMENTS

| 1,525,837 A | 2/1925 | Walker et al. |
| 2,357,373 A * | 9/1944 | Anderson ................. A01J 5/04 118/419 |

(Continued)

FOREIGN PATENT DOCUMENTS

| DE | 3931769 | 4/1991 |
| DE | 4101530 A1 | 7/1992 |

(Continued)

OTHER PUBLICATIONS

International Search Report for corresponding International Application No. PCT/EP2013/055265 dated Mar. 27, 2013.
(Continued)

*Primary Examiner* — Ebony E Evans
(74) *Attorney, Agent, or Firm* — Smith Law Office; Jeffry W. Smith

(57) ABSTRACT

The invention relates to a milking parlor arrangement (1), in particular a milking carousel, comprising at least one milking parlor (3) for milking milk-producing animals (T) and comprising an inner robot device with at least one robot arm (9). The at least one milking parlor (3) comprises two longitudinal sides and two narrow sides, namely a head narrow side and a hindquarters narrow side, one narrow side being paired with the head side of a milk-producing animal (T) to be milked as the head narrow side. The milking parlor also comprises an arm device (6) with a milking machine (5), said arm device being adjustable between a parked position and a working position and back. The at least one robot arm (9) is arranged on the head narrow side paired
(Continued)

with the head side of the animal (T) to be milked of the at least one milking parlor (3) of the milking parlor arrangement (1) in order to adjust the arm device (6).

33 Claims, 8 Drawing Sheets

(58) Field of Classification Search
CPC .. A01K 1/12; A01K 1/123; A01J 5/003; A01J 5/017
USPC ......... 119/14.04, 14.01, 14.02, 14.03, 14.18, 119/14.48
See application file for complete search history.

(56) References Cited

U.S. PATENT DOCUMENTS

| | | | |
|---|---|---|---|
| 3,448,725 A * | 6/1969 | Clegg | A01K 1/0209 |
| | | | 119/14.03 |
| 3,861,355 A | 1/1975 | Johnson et al. | |
| 3,870,021 A | 3/1975 | Nederbragt | |
| 4,171,684 A * | 10/1979 | Herr | A01K 5/01 |
| | | | 119/521 |
| 4,401,055 A | 8/1983 | Street et al. | |
| 4,459,940 A | 6/1984 | Noorlander | |
| 4,479,453 A | 10/1984 | Bonassi | |
| 4,508,058 A * | 4/1985 | Jakobson | A01J 5/013 |
| | | | 119/14.02 |
| 4,838,207 A * | 6/1989 | Bom | A01J 5/0175 |
| | | | 119/14.02 |
| 4,854,268 A | 8/1989 | Kipe | |
| 4,941,433 A * | 7/1990 | Hanauer | A01J 5/0175 |
| | | | 119/14.02 |
| 5,042,428 A * | 8/1991 | van der Lely | A01J 5/0175 |
| | | | 119/14.08 |
| 5,056,466 A * | 10/1991 | Dessing | A01J 5/0175 |
| | | | 119/14.18 |
| 5,383,423 A * | 1/1995 | van der Lely | A01J 7/04 |
| | | | 119/14.02 |
| 5,524,572 A | 6/1996 | Dessing et al. | |
| 5,586,518 A | 12/1996 | Carrano | |
| 5,595,945 A | 1/1997 | Wicks | |
| 5,596,945 A * | 1/1997 | van der Lely | A01J 5/0175 |
| | | | 119/14.03 |
| 5,606,932 A * | 3/1997 | van der Lely | A01J 5/007 |
| | | | 119/14.14 |
| 5,678,506 A | 10/1997 | Van Der Berg | |
| 5,697,324 A * | 12/1997 | van der Lely | A01J 5/007 |
| | | | 119/14.08 |
| 5,718,185 A | 2/1998 | Pichler et al. | |
| 5,718,186 A | 2/1998 | Van Der Lely | |
| 5,784,994 A | 7/1998 | Van Der Lely | |
| 5,862,776 A * | 1/1999 | van den Berg | A01J 7/04 |
| | | | 119/14.1 |
| 5,918,566 A * | 7/1999 | van den Berg | A01J 5/0175 |
| | | | 119/14.02 |
| 5,979,359 A | 11/1999 | Hansson | |
| 6,044,793 A | 4/2000 | Van Der Lely | |
| 6,050,219 A * | 4/2000 | van der Lely | A01J 5/0175 |
| | | | 119/14.04 |
| 6,116,188 A | 9/2000 | Van Der Lely | |
| 6,148,766 A | 11/2000 | Van Der Lely | |
| 6,205,949 B1 | 3/2001 | Van Den Berg | |
| 6,213,051 B1 * | 4/2001 | Fransen | A01J 5/0175 |
| | | | 119/14.01 |
| 6,244,215 B1 * | 6/2001 | Oosterling | A01J 5/0175 |
| | | | 119/14.02 |
| 6,279,507 B1 * | 8/2001 | van der Lely | A01J 5/0175 |
| | | | 119/14.01 |
| 6,336,424 B1 | 1/2002 | Kullberg et al. | |
| 6,357,387 B1 | 3/2002 | Johannesson | |
| 6,363,883 B1 | 4/2002 | Birk | |
| 6,382,130 B1 * | 5/2002 | Rooney | A01J 5/017 |
| | | | 119/14.01 |
| 6,386,141 B1 | 5/2002 | Forsen et al. | |
| 6,450,118 B1 | 9/2002 | Eppers, Jr. | |
| 6,532,893 B1 | 3/2003 | Edholm | |
| 6,584,929 B2 | 7/2003 | Van Der Lely et al. | |
| 6,814,224 B2 | 11/2004 | Garbagnati | |
| 6,843,203 B2 | 1/2005 | Johannesson et al. | |
| 7,104,218 B2 | 9/2006 | Teckentrup et al. | |
| 7,131,394 B2 | 11/2006 | Johannesson et al. | |
| 7,246,571 B2 | 7/2007 | Van Den Berg et al. | |
| 7,699,024 B2 | 4/2010 | Rysewyk et al. | |
| 7,762,405 B2 | 7/2010 | Vogel et al. | |
| 7,874,263 B2 | 1/2011 | Schulte | |
| 8,015,941 B2 * | 9/2011 | Hallstrom | A01K 1/12 |
| | | | 119/14.02 |
| 8,205,574 B2 | 6/2012 | Danneker et al. | |
| 8,281,744 B2 | 10/2012 | Van Den Berg | |
| 8,286,583 B2 | 10/2012 | Van Den Berg | |
| 8,601,979 B2 | 12/2013 | Van Der Sluis | |
| 8,646,412 B2 * | 2/2014 | Eriksson | A01K 1/126 |
| | | | 119/14.04 |
| 8,670,867 B2 | 3/2014 | Seaton et al. | |
| 8,704,396 B2 | 4/2014 | Leijon et al. | |
| 9,107,378 B2 | 8/2015 | Hofman | |
| 9,161,512 B2 | 10/2015 | Hofman | |
| 9,215,858 B2 | 12/2015 | Johannesson et al. | |
| 9,215,861 B2 | 12/2015 | Hofman et al. | |
| 9,402,364 B2 | 8/2016 | Seaton et al. | |
| 9,426,966 B2 | 8/2016 | Krone | |
| 9,491,924 B2 | 11/2016 | Hofman | |
| 9,681,634 B2 | 6/2017 | Hofman et al. | |
| 9,730,424 B2 * | 8/2017 | Krone et al. | A01K 5/041 |
| | | | 119/14.01 |
| 9,848,576 B2 | 12/2017 | Krone et al. | |
| 9,918,450 B2 | 3/2018 | Krone et al. | |
| 10,154,645 B2 | 12/2018 | Foresman et al. | |
| 2001/0028021 A1 | 10/2001 | Martin | |
| 2002/0002953 A1 * | 1/2002 | Lely | A01J 5/0175 |
| | | | 119/14.01 |
| 2004/0050331 A1 * | 3/2004 | Hein | A01K 1/123 |
| | | | 119/14.04 |
| 2004/0168645 A1 | 9/2004 | Deelstra | |
| 2005/0066904 A1 | 3/2005 | Berg et al. | |
| 2005/0072363 A1 | 4/2005 | Van Der Lingen et al. | |
| 2007/0277737 A1 | 12/2007 | Maier | |
| 2008/0149034 A1 | 6/2008 | Van Den Berg | |
| 2009/0007850 A1 | 1/2009 | Mehinovic | |
| 2010/0058990 A1 | 3/2010 | Danneker et al. | |
| 2010/0186676 A1 | 7/2010 | Van Den Berg | |
| 2010/0326361 A1 | 12/2010 | Van Den Berg | |
| 2011/0061596 A1 * | 3/2011 | Nilsson | A01J 5/0175 |
| | | | 119/14.08 |
| 2011/0114024 A1 * | 5/2011 | Van Den Berg | A01J 5/0175 |
| | | | 119/14.02 |
| 2012/0055408 A1 * | 3/2012 | Van Der Sluis | A01J 5/0175 |
| | | | 119/14.08 |
| 2013/0061807 A1 | 3/2013 | Axelsson | |
| 2013/0112142 A1 * | 5/2013 | Harty, Sr. | A01J 5/0175 |
| | | | 119/14.02 |
| 2013/0112145 A1 | 5/2013 | Carroll et al. | |
| 2014/0060436 A1 | 3/2014 | Krone | |
| 2015/0020738 A1 * | 1/2015 | Krone | A01J 5/0175 |
| | | | 119/14.04 |
| 2015/0059649 A1 | 3/2015 | Van Der Sluis | |
| 2015/0189854 A1 | 7/2015 | Krone et al. | |
| 2015/0296737 A1 | 10/2015 | Krone et al. | |
| 2017/0042110 A1 | 2/2017 | Krone et al. | |
| 2017/0086419 A1 | 3/2017 | Krone | |
| 2018/0020632 A1 | 1/2018 | Krone et al. | |
| 2018/0249670 A1 | 9/2018 | Krone | |

FOREIGN PATENT DOCUMENTS

| | | |
|---|---|---|
| DE | 4113700 A1 | 10/1992 |
| DE | 4237949 A1 | 5/1994 |
| DE | 4339131 A1 | 5/1995 |
| DE | 29522237 | 12/2000 |
| DE | 102006027919 | 12/2006 |
| DE | 102006049948 A1 | 4/2007 |

(56) References Cited

FOREIGN PATENT DOCUMENTS

| | | |
|---|---|---|
| DE | 202012005042 U1 | 10/2013 |
| DE | 60106877 T3 | 6/2014 |
| EP | 0576085 A2 | 12/1993 |
| EP | 0647390 | 4/1995 |
| EP | 0647391 | 4/1995 |
| EP | 0689762 A1 * | 6/1995 ............... A01K 1/12 |
| EP | 0734649 A2 | 10/1996 |
| EP | 0736246 A1 | 10/1996 |
| EP | 0811319 | 12/1997 |
| EP | 0657097 | 2/2002 |
| EP | 0862360 | 3/2003 |
| EP | 1084611 B1 | 9/2004 |
| EP | 0551960 | 9/2006 |
| EP | 1263283 B2 | 3/2014 |
| EP | 3335548 A1 | 6/2018 |
| GB | 1383038 | 2/1975 |
| RU | 2244417 | 1/2005 |
| RU | 2279796 C2 | 7/2006 |
| WO | WO9313651 | 7/1993 |
| WO | 94/23565 | 10/1994 |
| WO | WO9601041 | 1/1996 |
| WO | 96/17314 | 3/1996 |
| WO | 96/19916 | 7/1996 |
| WO | 96/19917 | 7/1996 |
| WO | 98/04121 | 2/1998 |
| WO | 98/05201 | 2/1998 |
| WO | 98/31212 | 7/1998 |
| WO | 98/46069 | 10/1998 |
| WO | 00/13492 | 3/2000 |
| WO | 00/13495 | 3/2000 |
| WO | 01/67852 A1 | 9/2001 |
| WO | 02/15676 | 2/2002 |
| WO | 2008/030084 A2 | 3/2008 |
| WO | 2008/118068 A1 | 10/2008 |
| WO | 2010/052156 A1 | 5/2010 |
| WO | 2011/098454 A1 | 8/2011 |
| WO | 2011/098994 | 8/2011 |
| WO | 2013/135842 A1 | 9/2013 |

OTHER PUBLICATIONS

International Search report for International Application No. PCT/EP2013/055272 dated May 28, 2013.
International Search Report for International Application No. PCT/EP2013/055288 dated May 24, 2013.
International Search Report for PCT Application No. PCT/EP2013/055270 dated May 28, 2013.
German Search Report dated Feb. 17, 2012 from German Patent Application No. 102011001404.7, 6 pages.
International Preliminary Report on Patentability and Written Opinion for PCT/EP2012/054645, English translation dated Sep. 24, 2013, 6 pages.
International Search Report and Written Opinion dated May 27, 2013, PCT Application No. PCT/EP2013/055265, 7 pages.
Non-Final Office Action dated Sep. 24, 2015, U.S. Appl. No. 14/002,076, 8 pages.
Non-Final Office Action dated Feb. 10, 2017, U.S. Appl. No. 15/247,544, 7 pages.
Non-Final Office Action dated Apr. 7, 2016, U.S. Appl. No. 14/002,610, 7 pages.
Non-Final Office Action dated Jun. 2, 2017, U.S. Appl. No. 14/002,610, 10 pages.
Final Office Action dated Dec. 19, 2016, U.S. Appl. No. 14/002,610, 6 pages.
Non-Final Office Action dated Dec. 7, 2016, U.S. Appl. No. 14/384,676 15 pages.
International Search Report for PCT/EP2015/061087 dated Sep. 7, 2015, 7 pages.
Non-Final Office Action dated Oct. 26, 2017, U.S. Appl. No. 14/384,668, 23 pages.
German Search Report dated Feb. 2, 2015 for German Application No. 10 2014 107 124.7, 6 pages.
Extended European Search Report for EP Application No. 18154736 dated May 2, 2018, 1 page.
Final Office Action dated Sep. 21, 2018, U.S. Appl. No. 14/384,668, 24 pages.
Germania Home Page on Jul. 28, 2005, http://www.germaniadairy.com/, 1 page.
Boumatic Home Page on Jul. 28, 2005, http://www.bou-matic.com/html/gallery/rotary_curtin.htm, 2 pages.
WestfaliaSurge brochure "External Autorotor" dated Jan. 2001, 22 pages.
Germania sales brochure "Introducing—Profundly Productive PRO-TIME Parlors From Germania: Milking Parlors for the Next Century—And Beyond?" printed Nov. 1996, 8 pages.
Germania Dutch brochure "Vele Nederlandse melkveehouders ginge u voor!: Germania Melksystemen de trots van eleke veehouder", 6 pages.
"Offer of Germania milking systems VOF, Oude Lievervelderweg2. 7137 MA Lievelde, NL, to Mr Hummel, Am Milchweg 01,Ivenack, DE, dated Aug. 12, 1997, 10 pages."
"Fax cover sheet of a Germania milking system VOF fax,Lievelde, NL, sent to M. Hummel Jul. 10, 1997, 1 pages"
Germania Final Quality Control/Inspection Certificate, dated Oct. 9, 1999, 1 page.
Germania technical drawing titled "Protime I Stall" dated May 10, 1997, 1 page.
Photos of a Germania double-herringbone parlor installed in Hummel GmbH cattle plant in 1999, 13 pages.
Westfalia Landtechnik GmbH advertising brochure "AutoRotor—Milk Carousel Systems" publication date Feb. 1997, 12 pages.
Westfalia Separator AG order confirmation and invoice dated Aug. 17, 1995, 22 pages.
Photos of a Westfalia Separator AG milking parlor installation at the Birkholz Estate, dated Sep. 2018, 7 pages.
"Reflections: A history of DeLaval" 5 pages.
Non-Final Office Aciton dated Jun. 28, 2019, U.S. Appl. No. 14/384,668, 15 pages.
Non-Final Office Action dated Sep. 12, 2019, U.S. Appl. No. 15/971,187, 32 pages.

* cited by examiner

MILKING PARLOR ARRANGEMENT WITH AN INNER ROBOT DEVICE

The invention relates to a milking parlor arrangement according to the preamble of claim 1.

A milking parlor arrangement of this type is used to milk milk-producing animals mechanically. Milk-producing animals are, for example, cows, buffalos, goats, sheep etc. The milking parlor arrangement comprises milking parlors which are separated by space dividers. The milking operation can be automated by means of so-called milking robots. Rotary milking parlors, for example, are in use.

The term milking parlor arrangement refers to arrangements of milking parlors, an angular position of an imaginary longitudinal axis of an animal to be milked in a milking parlor with respect to a reference line being able to be between 0° and 90°. The longitudinal side of a straight pit or a tangent of a circular pit, which is the place occupied by the milking staff, is used, for example, as a reference line. Movable milking parlor arrangements are, for example, rotary milking parlors as external rotaries and internal rotaries, both types with arbitrary direction of rotation. So-called side-by-side milking parlors can also be realized as movable milking parlor arrangements. In addition, group milking parlors are also non-movable, such as, for example, herringbone milking parlors and tandem milking parlors. This listing is only as an example and is not limiting.

EP 1 084 611 B1 describes a robot arm structure with a pivotable carrier unit for a milking cluster. The structure is movable on one or several rails along one or several milking boxes.

Existing automation technology is not suitable or is only suitable in a limited manner for large installations as a result of a low throughput. The ever more stringent requirements in particular for high throughput figures and continuous operation necessitate, in the case of modern milking robots which are complex and expensive, several milking parlors to be used at the same time. This can work out disadvantageously, among other things as a result of greater complexity and resultant higher default probability, discontinuous operation, areas blocked to the staff (safety in the robot area). Access to the positioning equipment is limited in time and space. Contamination of the milking equipment can be increased when the teat cups are supplied from the rear through the legs of the animals to be milked. The installation can only have low tolerance for the teat cups dropping off. Correspondingly high operating and maintenance costs can arise on account of the complex equipment.

Against said background, the object of the invention is to create an improved milking parlor arrangement as well as a milking parlor.

Said object is achieved by a milking parlor arrangement with the features of claim 1.

A milking parlor arrangement according to the invention, in particular a rotary milking parlor, includes at least one milking parlor for milking milk-producing animals, an inner robot device having at least one robot arm, wherein the at least one milking parlor comprises two longitudinal sides and two narrow sides, namely one head narrow side and one hind quarter narrow side, of which one narrow side as head narrow side is associated with the head end of an animal to be milked, and one arm device with a milking cluster which is adjustable from a park position into an operating position and back. For adjusting the arm device, the at least one robot arm is arranged on the head narrow side of the at least one milking parlor of the milking parlor arrangement, said head narrow side being associated with the head end of the animal to be milked. In this case, with a rotary milking parlor, the robot arm can be arranged in an interior of the milking parlor arrangement.

The milking parlor comprises two longitudinal sides and two narrow sides. Of the narrow sides, one is designated as the head narrow side which is associated with the head end of an animal to be milked that is situated in the milking parlor. In a corresponding manner, the other narrow side is designated as the hind quarters narrow side and is associated with the hind quarters of the animal to be milked that is situated in the milking parlor.

In the case of a milking parlor arrangement with rectangular milking parlors which are arranged next to one another and in each case comprise parallel longitudinal sides, as is the case, for example, in a side-by-side arrangement, the arm device is arranged, for example, in a space divider parallel to an imaginary longitudinal axis of the animal to be milked. In this case, it is assumed for the purposes of simplification that the animal to be milked with its imaginary longitudinal axis stands still in an ideal state during the milking operation. A narrow side, namely the head narrow side, of the milking parlor is associated with the head end of the animal to be milked.

In the case of a milking parlor arrangement with milking parlors that are arranged in a circular manner such as in the case of a rotary milking parlor, the longitudinal sides of the milking parlors are not parallel. In said case, the longitudinal sides are segments of radii of a circle of the rotary milking parlor and in the imaginary extension intersect in the center point of said circle or in the pivot point of the rotary milking parlor, thereby forming a center angle. The imaginary longitudinal axis of the animal to be milked also extends in the ideal case through the pivot point and halves the center angle. Here, said case is abbreviated further below by way of the term "approximately parallel".

The term exterior region or operating region is to be understood as the region in which the milking staff are located, but no robot is arranged. This can be, for example, the region around the outer circumference of a rotary milking parlor or the region of a pit between two side-by-side milking parlor arrangements which are arranged in line.

The term hardware region is the region in which the robot device is arranged.

It is provided in one realization that in the park position the arm device with the milking cluster is arranged along one of the longitudinal sides of the milking parlor at the side of an animal to be milked. As a result, in the park position the arm device with the milking cluster is not in the region of the animal to be milked and does not bother said animal, e.g. on entry into the milking parlor.

In one realization, in a fully automatic mode the robot arm is realized for adjusting the arm device from the park position in the operating position into a positioning position for automatically positioning the milking cluster onto the teats of the animal to be milked.

In one realization, the robot arm is movable and guided on a rail, in particular within a positioning region.

In another realization, several robot arms can also be movable and guided on a platform on the rail.

If the milking parlor arrangement is designed as a rotary milking parlor, the rail is arranged concentrically to a pivot point of the rotary milking parlor, and in the case of a milking parlor arrangement in a straight design, for example in a side-by-side arrangement, it is arranged parallel to the milking parlor arrangement.

In a further realization, the rail is fastened on the milking parlor arrangement. As a result, a movement of the milking parlor arrangement, for example as a rotary milking parlor a rotary movement in a clockwise or anti-clockwise direction, can be transmitted synchronously to the rail and consequently to the at least one robot arm.

As an alternative to this, the at least one robot arm of the inner robot device can be movable on the rail synchronously with a movement of the milking parlor arrangement and independently of the movement of the milking parlor arrangement.

As a result of the at least one robot arm, each milking parlor can be accessed by the same. Only one inner robot device with said at least one robot arm is necessary for positioning the milking cluster.

The robot arm can carry out all the positioning operations one after another. A throughput is increased with several robot arms.

Several robot arms can also be moved on the rail in this way or arranged in different regions and moved in said regions in order to perform not only positioning operations but also removal operations. As a result, a high level of adaptability to different operations is possible.

In a further realization, the milking clusters can be removed by the arm device and by means of simple actuators, e.g. chains or removal cables which are situated on each milking parlor.

A further advantage is that the milking parlors can all be equipped identically with the arm device and the milking cluster, i.e. with a passive, mechanical milking module, no drives or only simple drives being necessary for removal per milking parlor.

If each milking stall is provided with the same milking module, i.e. arm device and milking cluster, no mechanical couplings to the adjacent milking parlors can arise.

The rail is preferably arranged above the animals to be milked and consequently lies outside the reach of the animals. A reduced risk of contamination is possible.

Advantageous further developments and developments of the milking cluster or of the milking parlor are the object of the respective dependent claims.

The animals to be milked can enter or leave the milking parlor arrangement by means of one or several entries and exits. In this way, a higher throughput is possible with several robot arms.

In another realization, the rail is arranged parallel to the milking parlor arrangement. As a result, it is possible for the at least one robot arm of the inner robot device to be movable on the rail synchronously with a movement of the milking parlor arrangement and independently of the movement of the milking parlor arrangement. In other words, the robot arm can carry out the positioning operation of the milking cluster during the movement of the milking parlor arrangement, then return into its original position, be moved on the rail to the following milking parlor against the movement of the milking parlor arrangement and perform a positioning operation again. Where there are several robot arms, the slowest robot arm determines the tempo of the unit of all the robot arms.

In yet another realization, it is provided that the at least one robot arm is realized so as to be adjustable in a radial direction for adjusting the milking cluster from the park position into the operating position and back. The robot arm consequently requires only one direction in one plane for the intervention. A gripping portion can enable additional manipulation axes in order to position the milking cluster.

In an alternative realization, the at least one milking parlor comprises a region which is separated from a surface of a standing unit of the milking parlor by a step, is arranged at a greater height and has a front foot plate. In this way the robot arm lies outside the field of vision of the animal.

In this case, the at least one robot arm can be realized so as to be adjustable in the radial direction at the side and parallel or substantially approximately parallel to the longitudinal axis of the animal to be milked. It consequently moves within a region which is at a spacing from the region of contamination and moisture of the animal to be milked.

In an alternative realization, the at least one robot arm is realized so as to be adjustable in the radial direction along the longitudinal axis of the animal to be milked. In this case, the robot arm covers the longest distance below the front foot plate, which also occurs undetected by the animal. In this case, the at least one robot arm can be realized so as to be adjustable through an opening of the step in the radial direction also in the direction of the longitudinal axis of the animal to be milked.

In a further realization, the arm device with the milking cluster is arranged in the park position in a space divider which is arranged on a longitudinal side of the milking parlor, or is arranged in a region in a longitudinal axis of the space divider and is adjustable into the operating position at the side of the animal to be milked. Consequently, the milking cluster also lies outside the region of contamination and moisture of the animal to be milked.

In yet another realization, it is provided that the arm device comprises an upper arm and a lower arm which is pivotably coupled therewith. In this way, the arm device can be folded in with the milking cluster and be arranged in the park position requiring little space.

In this connection, the arm device can be mounted and guided by means of a bearing unit so as to be rotatable and in a vertical direction. The bearing unit can be arranged above an animal to be milked, below a standing unit of the at least one milking parlor or on the standing unit of the at least one milking parlor. Adaptation to different installation situations is thus possible.

In yet another realization, the arm device with the milking cluster can be arranged in the park position in the space divider in an opening of a cladding of the space divider. Consequently, the arm device with the milking cluster is completely out of sight of the animal to be milked when said animal enters the milking parlor. In addition, the cladding provides not only visual protection but greater protection from injury for the animal to be milked as also protection against contamination and moisture when the opening of the cladding of the space divider with the arm device arranged therein in the park position with the milking cluster is realized so as to be closable by way of a protective covering. The protective covering can be provided with actuating portions, e.g. recessed openings with hooks which are actuatable by the robot arm.

A further advantage is produced when a cleaning device for the milking cluster is arranged in the space divider or within the region of the park position of the arm device with the milking cluster. On account of the small amount of space required for the folded-in arm device with the milking cluster in the park position, the cleaning device can also be arranged and/or incorporated within the region of the longitudinal axis of the space divider and/or in the space divider itself.

In yet another realization, the arm device with the milking cluster comprises an overload protection. As a result, there is a tolerance in relation to violent animal movements, active avoidance by means of object recognition by means of a camera which is also usable for positioning purposes and other tasks. In addition, a type of jamming protection can also be formed during positioning by means of the robot arm when said robot arm is realized with a means for monitoring the consumption of its motors. It is also possible for further sensors to be incorporated on the robot arm for this purpose. In addition, the robot arm is able to activate, for example, passive sensors on the milking cluster and/or the arm device during positioning.

For simple handling by the robot arm during positioning, the arm device can comprise parallel guiding for the milking cluster.

Said parallel guiding can comprise push rods or/and pulling means. In this case, they can be installed in a preferred manner inside the arms of the arm device. The pulling means can be belts, for example. Said pulling means can then themselves form or support an overload protection as they comprise a certain elasticity. However, it is also possible to provide additional springs and dampers which are coupled with the pulling means, e.g. tensioning devices.

In a further realization, it is provided that the robot arm comprises at least one positioning sensor. Said positioning sensor can be used for positioning the teat cups of the milking cluster on the udder. However, additional advantages are also possible as a result. The positioning sensor can be an optical sensor, e.g. a camera which detects movements of the animal to be milked. It can additionally be utilized as an input device for gesture control. In addition, the camera can take photographs of the udder with the teats, as result of which the health of the udder can be assessed (abnormalities, appearance, swellings, cleanliness). As a result of this, ill animals and animals with dirty udders can be separated out (by an automatic system, e.g. a selection device, or staff). The separating out of the animals to be milked can be monitored, as a result of which an appropriate cleaning of the milking parlor is possible. The teat cups can be realized in a transparent manner with contrasting elements (rings, bars, cylinders etc.) installed as an option. The transparency enables a check as to whether the teats are correctly situated in the cups and whether the milk is flowing. The contrasting elements serve for finding the object of the teat cups as well as for calibrating the camera of the positioning sensor.

The milking parlors can comprise a sloping manure gutter on the floor of the standing unit to reduce contamination caused by excrement dropping from the animal to be milked.

The robot arm can comprise further sensors which are connected to its control unit. Thus, by means of the camera, the control unit is able to switch on and off, move in and out and/or clean for example components of the robot arm, the arm device and/or the milking cluster as a result of gestures and by means of acoustic sensors as a result of acoustics.

The milking parlor arrangement can also comprise a form that differs from the circular. Thus, for example, an arcuate form or straight line is possible.

In an alternative realization, in a semi-automatic mode, the arm device can be adjustable from the park position into the operating position by means of a simple actuator, wherein the operating position is a fixed pre-position which is fixable beforehand by stopping means, wherein in the pre-position, the milking cluster is in a position that is favorable to a milker.

Further advantages are listed below:
  Modular, flexible design of the milking module is suitable for individual parlors, group milking parlors and rotary milking parlors
  High level of operating productivity
  High level of operational readiness as a result of redundant milking modules and several robot arms
  Redundant design with high level of fault tolerance
  Tolerance in relation to violent animal movements and knocks/kicks
  The exterior region can be entered at any time by the staff completely without obstruction and endangering by devices in order to intervene, for example, in a correcting and/or helping manner. The interior is only occupied in part by the inner robot device. Additional protection of the robot region in the hardware region is not necessary as the staff stay in the exterior region and the robot is arranged in the interior separated from them
  High level of adaptability in different automation steps
  Robot arms and milking clusters are not in the field of vision of the animal to be milked when it enters the milking parlor and the same is true in part also during the positioning or removal process
  Assembly and disassembly as well as maintenance of the milking parlor arrangement are simple
  Emergency milking is possible as a result of a backup. The milker can intervene in any milking parlor from outside and, for example, re-position a milking cluster that has dropped-off or been separated
  The positioning operation runs hygienically from the side
  The level of complexity is low
  Mass production is possible
  Variety of options can be reduced
  Existing manual milking parlors can be fitted in retro.

Further advantages and details proceed from the exemplary embodiment shown in the figures of the drawing, in which:

FIGS. 6-6a show a longitudinal sectional view and front view of an exemplary embodiment of a robot arm;

FIGS. 7-7a show different sectional views of the robot arm according to FIG. 6;

Identical or similar functional elements are provided with identical references in the figures.

Figure 1:
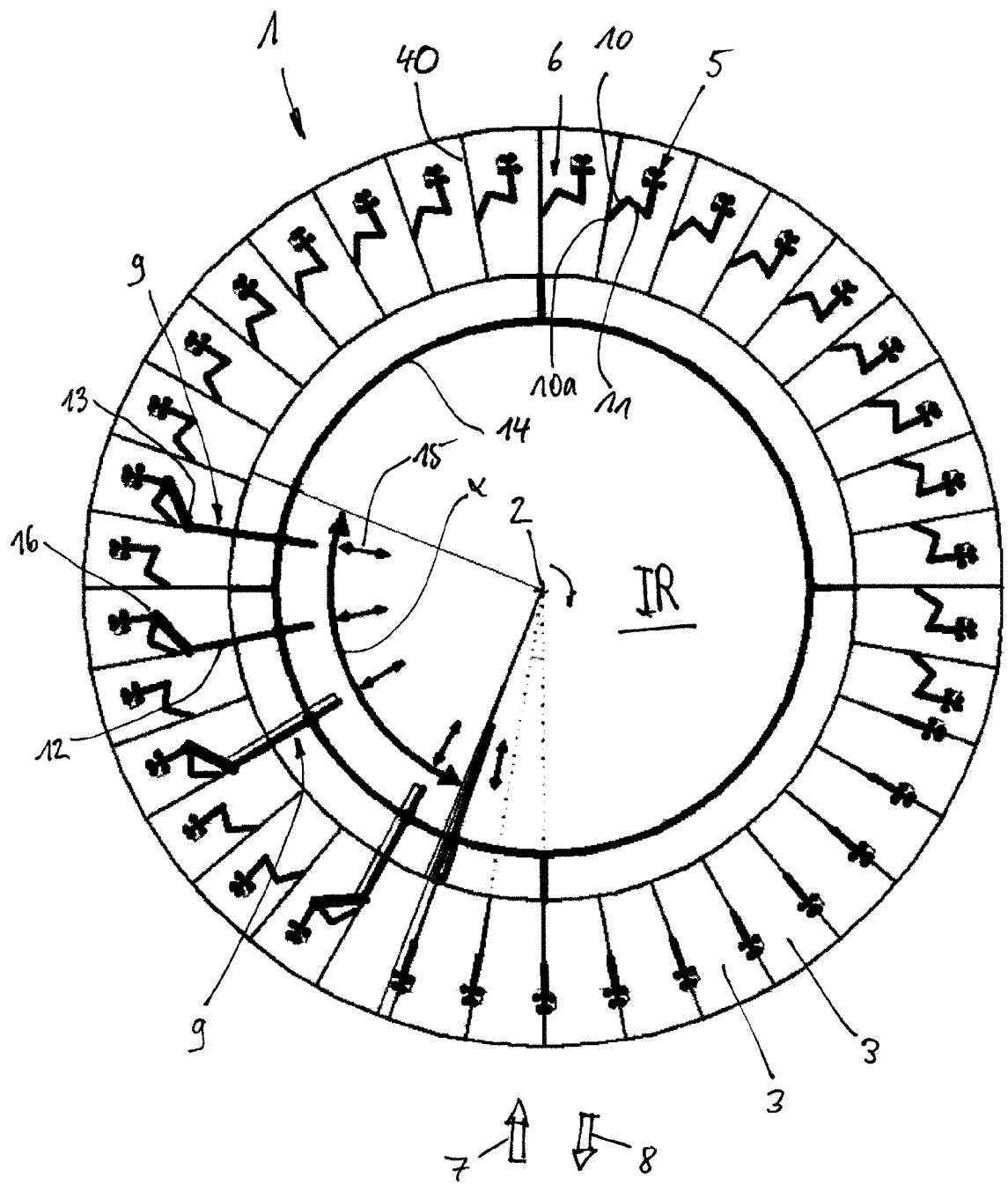
FIG. 1 shows a schematic top view of an exemplary embodiment of a milking parlor arrangement according to the invention.

FIG. 1 shows a schematic top view of an exemplary embodiment of a milking parlor arrangement 1 according to the invention.

The milking parlor arrangement 1 is constructed in the manner of a so-called exterior rotary milking parlor. In this case, the animals to be milked stand with their heads directed toward a center, i.e. a pivot point 2. The rotary parlor is rotatable in a clockwise manner about the pivot point 2. In this example, thirty six milking parlors 3 are arranged on the circumference of the rotary parlor. Each milking parlor comprises two longitudinal sides and two narrow sides. One narrow side is designated as the head narrow side and is associated with the head end of an animal to be milked that is situated in the milking parlor 3. In FIG. 1, the head narrow sides of the milking parlors 3 point to an interior IR, and the other narrow sides, which are designated as hind quarter narrow sides, are associated with the hindquarters of the animal to be milked. The milking parlors 3 are separated by space dividers 40. The space dividers 40 are also designated as side frames and are aligned approximately parallel to the longitudinal axis of an animal to be milked. The milking parlor arrangement 1 is used to milk milk-producing animals, e.g. cows, in a mechanical manner by means of milking clusters 5. In each case one milking cluster 5, which is adjustable in a milking parlor 3 by means of an arm device 6 from a park position into an operating position under the udder of a cow, is provided for each milking parlor 3. Each milking cluster 5 is arranged inside a space divider 40 or in the longitudinal region of a space divider 40 between the milking parlors 3.

The animals to be milked can enter the rotary parlor by means of an entry 7 and once the milking operation has been completed can leave it again by means of an exit 8. Once an animal has entered a milking parlor 3, it is important for the animal to assume a pre-defined position. This is achieved by the space dividers 40 forming an enclosed milking parlor 3. Then inside a segment of a circle which, in this case, is designated as positioning region α, the milking cluster 5 is adjusted out of the park position in the space divider 40 at the side of the animal to be milked into the operating position under the udder of the animal and is positioned thereon by means of a positioning sensor 16 (see FIG. 9 also).

Positioning technology for adjusting the arm device 6 with the milking cluster 5 is provided in an interior IR of the milking parlor arrangement 1 on the head narrow sides of the milking parlors 3 in the form of an inner robot device. In said exemplary embodiment, the inner robot device includes five robot arms 9 which are movable independently of one another on a rail 14. The robot arm 9 will be described in more detail below. Each robot arm 9 comprises a straight radial portion 12 and a gripping portion 13 which is pivotable about a vertical hand joint axis 27a (see FIG. 6) on the outside end thereof. The rail 14, in said exemplary embodiment, is arranged above the milking parlors 3 outside the reach of the animals and protected from contamination. In the case of said milking parlor arrangement 1, which is realized here as a rotary milking parlor with the pivot point 2, the rail 14 is also developed in a circular manner concentrically with the circular design of the rotary milking parlor with the pivot point 2 of the rotary milking parlor as the center. In this way, when the milking parlor arrangement 1 rotates, the robot arms 9 are also movable at the same time in a synchronous manner with said rotation. The rotation of the milking parlor arrangement 1 can be uninterruptedly sustained.

I.e. as soon as an animal has entered a milking parlor 3, is calmed and ready for milking, which is detectable, for example, by means of a suitable animal sensor system (e.g. camera, movement sensor, acoustic sensor etc.) and actor system (e.g. feed delivery/acceptance), the robot arm 9 is moved out of a start position on the head narrow sides of the milking parlors 3 in the interior IR, in which it does not reach into the milking parlors 3, in the radial direction 15 outward between two milking parlors 3 in the region of the space divider 40 into its positioning position, takes hold of a portion of the arm device 6 and moves it out of the region of the space divider 40 to the side out of the park position into the operating position under the udder of the animal. The milking cluster 5 is moved in this way to the side of the animal to be milked in the milking parlor 3 and from the side of the animal is positioned under its udder. At the same time, the positioning operation of the milking cluster 5 is supported. The arm device 6 holds the milking cluster 5, the teat cups of which are positioned on the teats of the udder.

As soon as the milking cluster 5 is positioned, the robot arm 9 is released from the arm device 6 and moves in the radial direction 15 back into the interior IR into its start position. The arm device 6 carries the milking cluster 5 and consequently its weight, only the teat cups being suspended positioned on the teats of the udder with a weight that is small in comparison with a weight of the milking cluster 5 and of the arm device 6 including the hoses. During said positioning operation, the rotary milking parlor continues to be moved continuously without interruption, in this case in a clockwise direction about the pivot point 2. Naturally, rotating in an anti-clockwise direction is also possible. The robot arm 9 (or also the other ones) is/are moved on the rail 14 during the positioning operation, in a preferred manner within the positioning region α, in the same direction of rotation and at the same angular speed in a synchronous manner with the rotary milking parlor. The rail 14 is arranged above the milking parlors 3 outside the reach of the animals and protected from contamination and is preferably fastened on the milking parlor arrangement 1, i.e. on the moving part thereof.

The arm device 6 comprises an upper arm 10 and a lower arm 11 and is guided and mounted by way of one end of the upper arm 10 in a bearing unit 10a inside the space divider 40 so as to be pivotable about a vertical axis 33 (see FIG. 9) and adjustable vertically along the vertical axis 33. The bearing unit 10a can be attached at the top or bottom of the space divider 40, above the animal to be milked (see FIG. 8 also). The function of the arm device 6 is to carry the milking cluster 5 so as to balance its weight and thus to run smoothly in such a manner that it follows the movements of the animal to be milked. The arm device 6 will be described in more detail below.

The rail 14 can be realized as an individual rail or a multipart rail. In an advantageous manner, it can be provided as a complete circle, but also as a circle segment. As the robot arms 9 only have to engage with the milking cluster 5 within the limited positioning region α between the milking parlors 3 for positioning and withdrawing the arm device 6, the rail 14 can be realized, for example, as a segment of a quarter circle. It is also possible for the rail 14 to form, for example, a segment of a semi-circle, a segment of a quarter circle of the segment of the semi-circle including the robot arms 9 for positioning within the positioning region α, and the other segment of the quarter circle comprising further robot arms 9, which are arranged side by side in the anti-clockwise direction, for removing and resetting the arm devices 6 with the milking cluster 5 into the park position.

All the milking parlors 3 on the outer circumference of the milking parlor arrangement 1 are freely accessible by a milker from the exterior region, i.e. from the rear quarter narrow sides of the milking parlors 3, such that he is able to intervene in a milking operation at any time. Said operating region is consequently kept free of additional devices, whereas the robot arms 9 operate within a restricted area only in the interior IR. In this way, the milker is not obstructed when he has to control, care for and intervene in a correcting manner in the entire milking parlor arrangement 1, which is also called an "automated exterior rotary milking parlor" in said exemplary embodiment. Even when a manual intervention by the milker is necessary, e.g. if the teat cups of the milking cluster 5 have dropped off, the rotary milking parlor can continue to operate.

Once the milking operation has been completed, the milking cluster 5 is automatically removed from the animal to be milked or drops off itself into a standby position or an end-of-milking position. The milking cluster 5, in this case, can then be moved into the park position by a simple actuator, e.g. with a chain or cable. Said simple actuator can be mounted on the space divider 40. The rotary milking parlor continues to move during said operation also.

Figure 2:
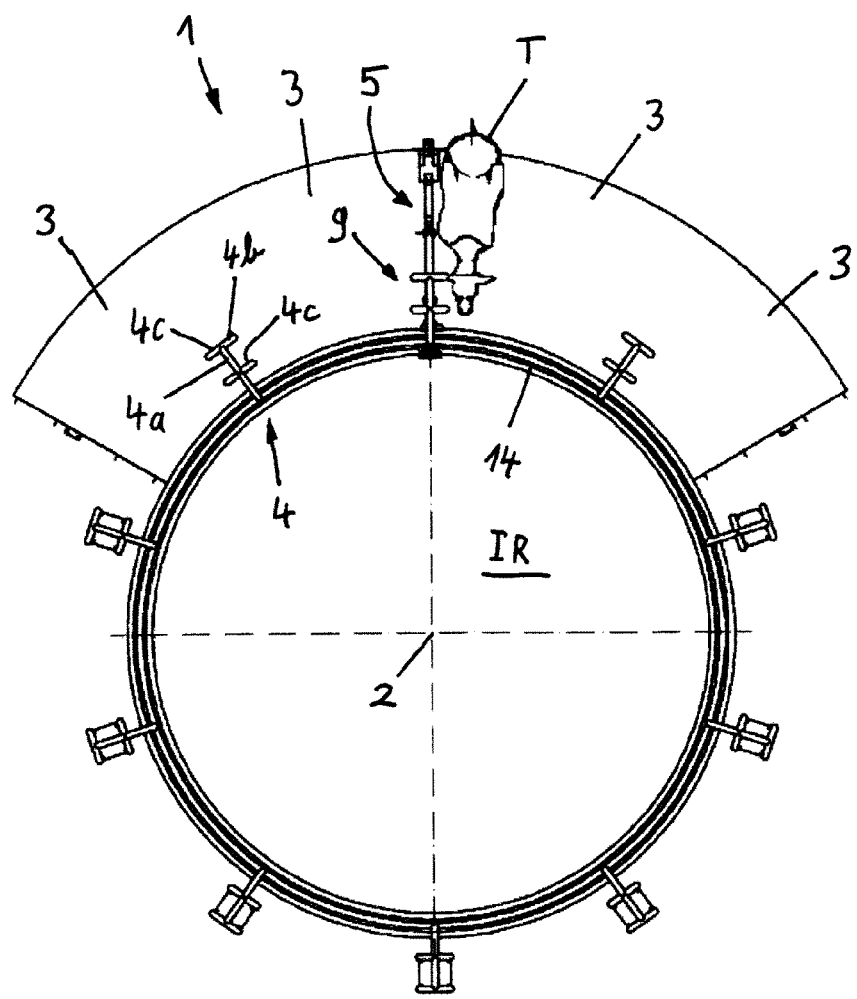
FIG. 2 shows a schematic top view of a variation of the exemplary embodiment according to FIG. 1.
Figure 3:
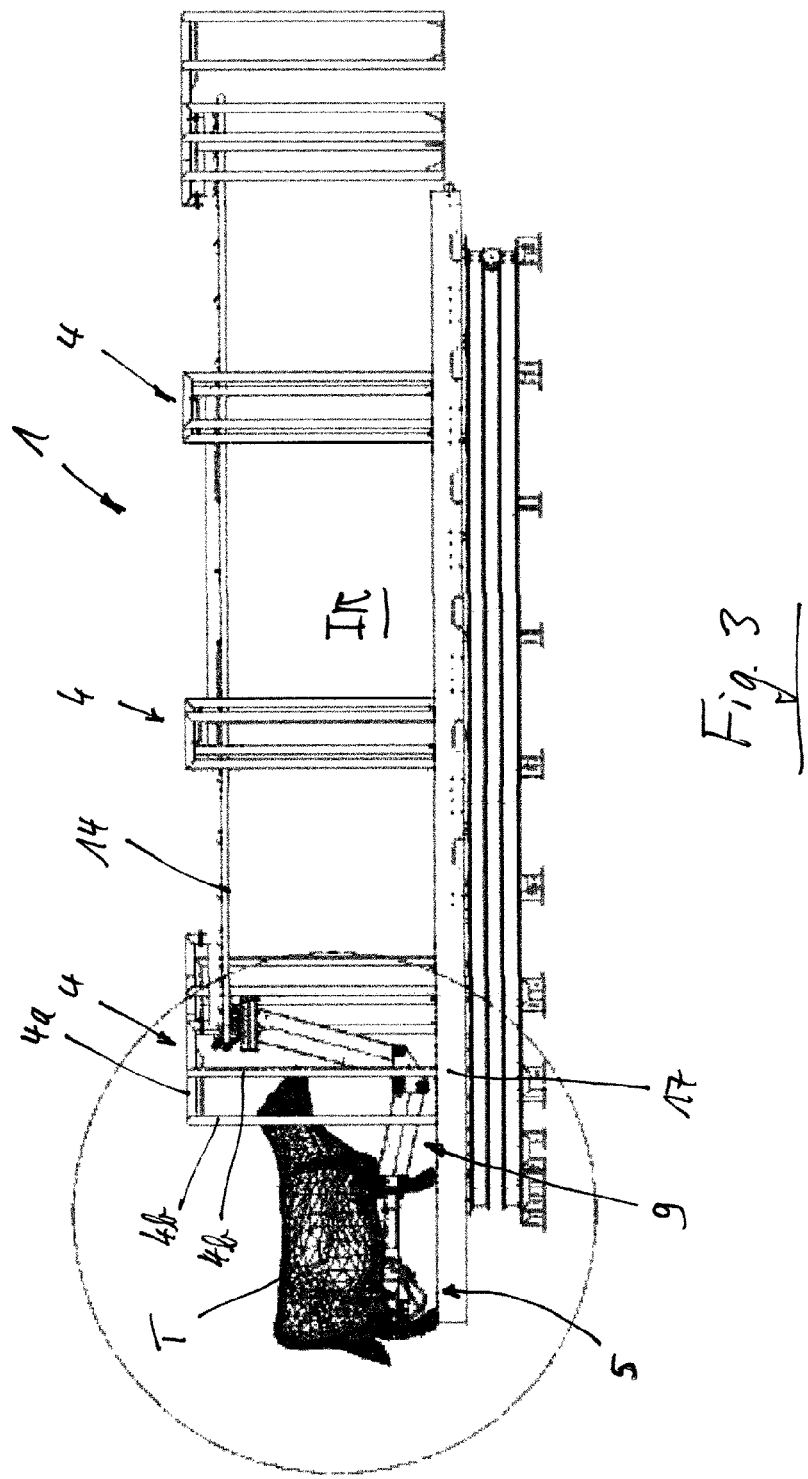
FIG. 3 shows a schematic side view of the milking parlor arrangement according to the invention according to FIG. 2.
Figure 4:
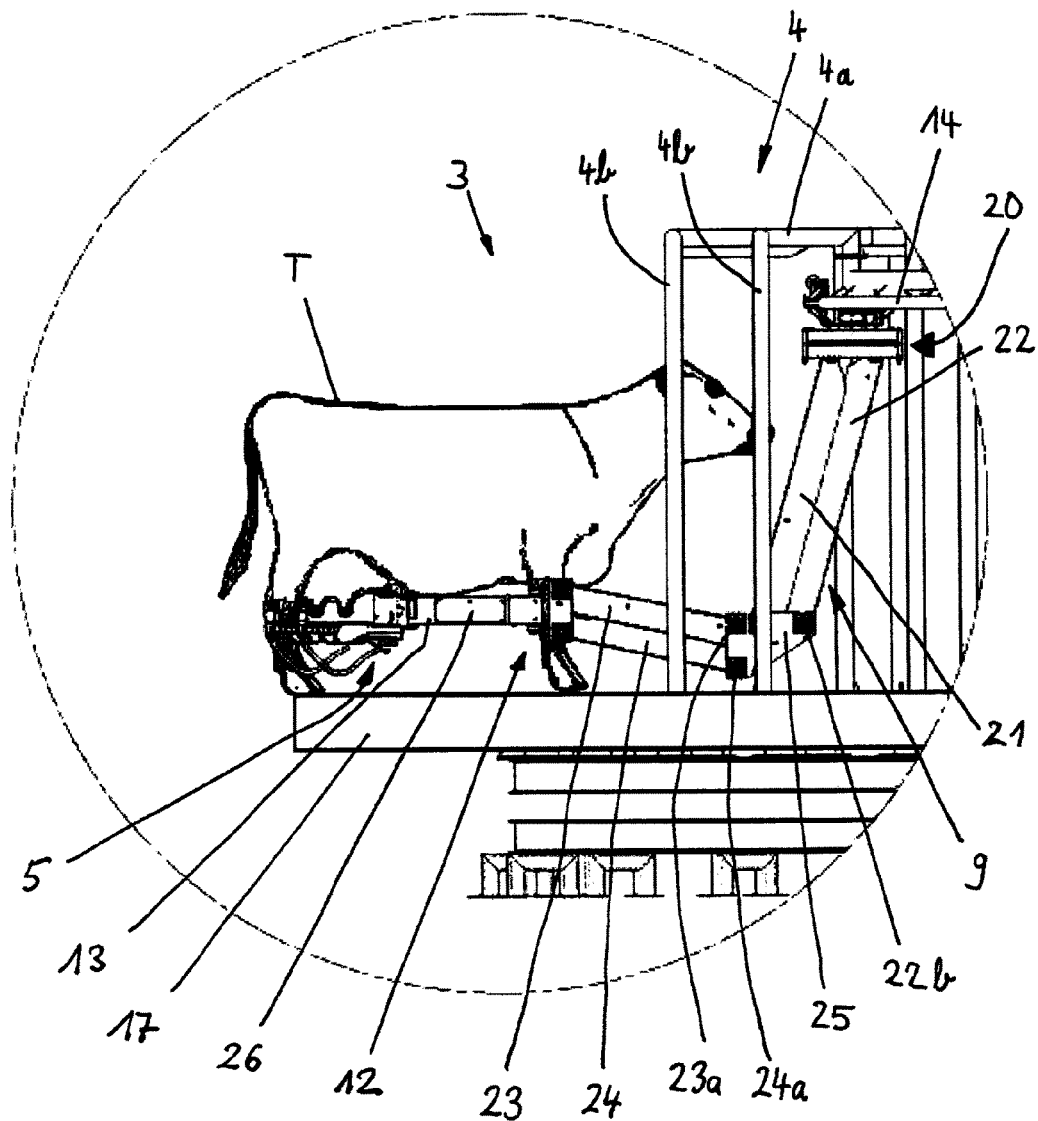
FIG. 4 shows an enlarged view of the circled region in FIG. 3.

FIG. 2 shows a schematic top view of a variation of the exemplary embodiment of the milking parlor arrangement 1 according to FIG. 1. FIG. 3 shows a schematic side view of the milking parlor arrangement 1 according to the invention according to FIG. 2, and FIG. 4 provides an enlarged view of the encircled region in FIG. 3.

The variation shown is also a rotary milking parlor with milking parlors 3 which are separated by space dividers 40 which are not shown here (see FIG. 1) pointing toward the interior IR. An animal to be milked T, which in this case is a cow, is situated in a milking parlor 3. FIG. 2 shows a circumferential rail 14 in a circular form which is mounted on rail carriers 4 above the milking parlors 3 (this can be seen clearly in FIGS. 3 and 4). Each rail carrier 4, in this case, includes a horizontal strut 4a and four vertical struts 4b, in each case two vertical struts 4b are connected by way of their upper ends by means of a cross connector 4c. The cross connectors 4c extend tangentially to the rotary milking parlor and support the horizontal strut 4a which extends in the radial direction of the rotary milking parlor. The horizontal strut 4a is connected to the cross struts 4c by way of its radial outer end and in the center. The other end of the horizontal strut 4a, which points to the pivot point 2 of the milking parlor arrangement 1, carries the rail 14 which is developed here as a dual version. The rail 14 is circular and serves for moving the robot arms 9, only one of which is shown here. The robot arm 9 is adjusted into its operating position, in this case, radially into the space in each case between two vertical struts 4b of the rail carrier 4.

A side view of the design of the rail carrier 4 can be seen more clearly in FIG. 3. The milking parlor arrangement 1 as a rotary milking parlor comprises a standing unit 17 which is rotatable about the pivot point 2. The milking parlors 3 are arranged with the rail carriers 4 on the standing unit 17. The vertical struts 4b of the rail carriers 4 are mounted on the standing unit 17. The robot arm 9 is situated in the operating position in which the milking cluster 5 is positioned, which is shown in an enlarged manner in FIG. 4.

An attaching of the arm device 6 to the milking cluster 5 in the radial development of the space divider 40 (see FIG. 1) is not shown, but is easily imaginable. It is arranged such that, when the animal T enters into the milking parlor 3, it does not obstruct it and is preferably concealed.

The robot arm 9 of the inner robot device comprises, in said exemplary embodiment, a trolley 20, a robot upper arm 21-22, a robot lower arm 23-24, an angle 25 and a hand portion 26 with the gripping portion 13.

The robot arm 9 is fastened on the rail 14 by way of the trolley 20. A movement drive (not shown in any detail), by way of which the robot arm 9 is adjustable along the rail 14, is arranged in the trolley 20.

Figure 5:
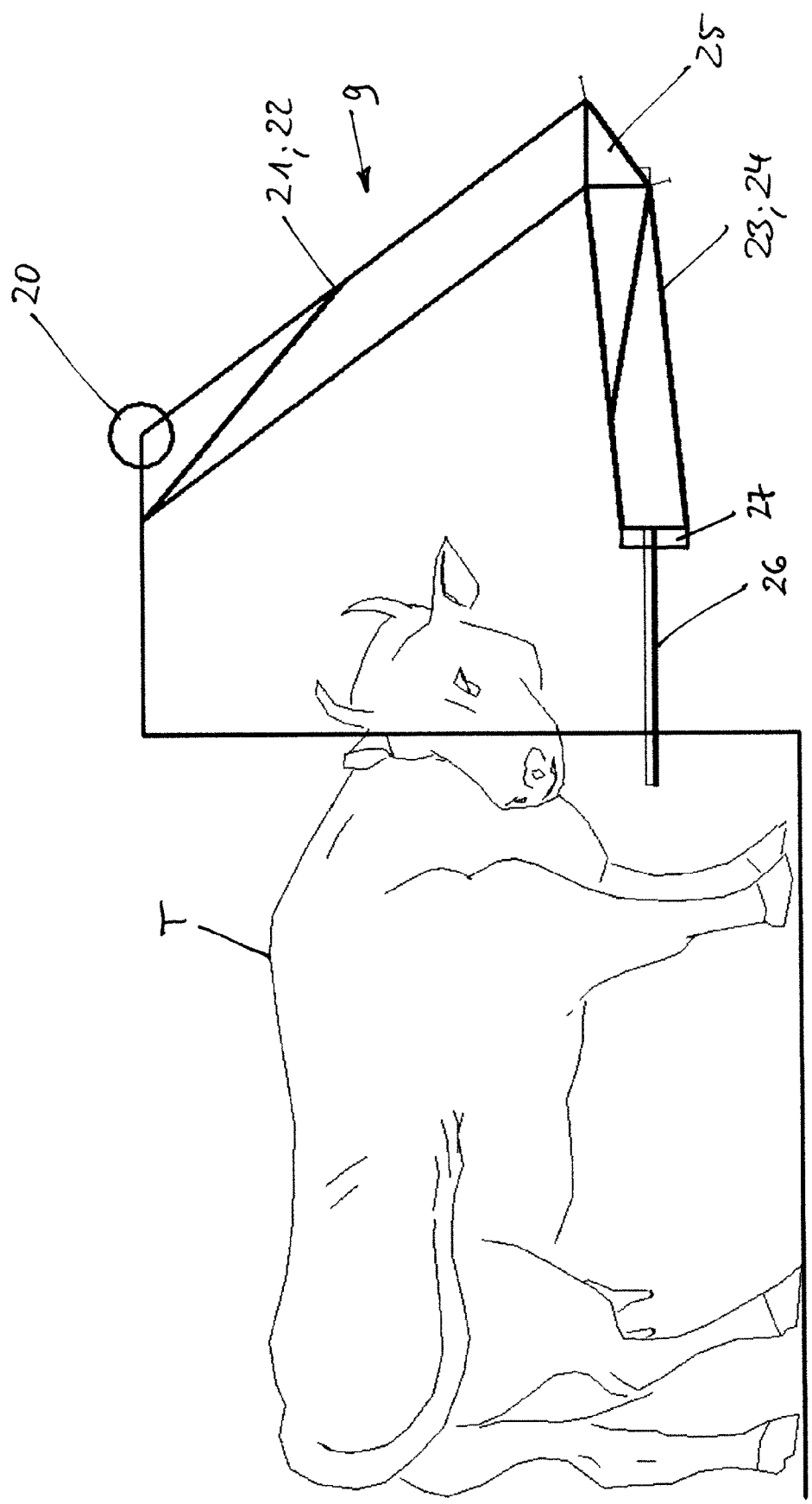
FIG. 5 shows a schematic diagram of an inner robot.
Figure 6:
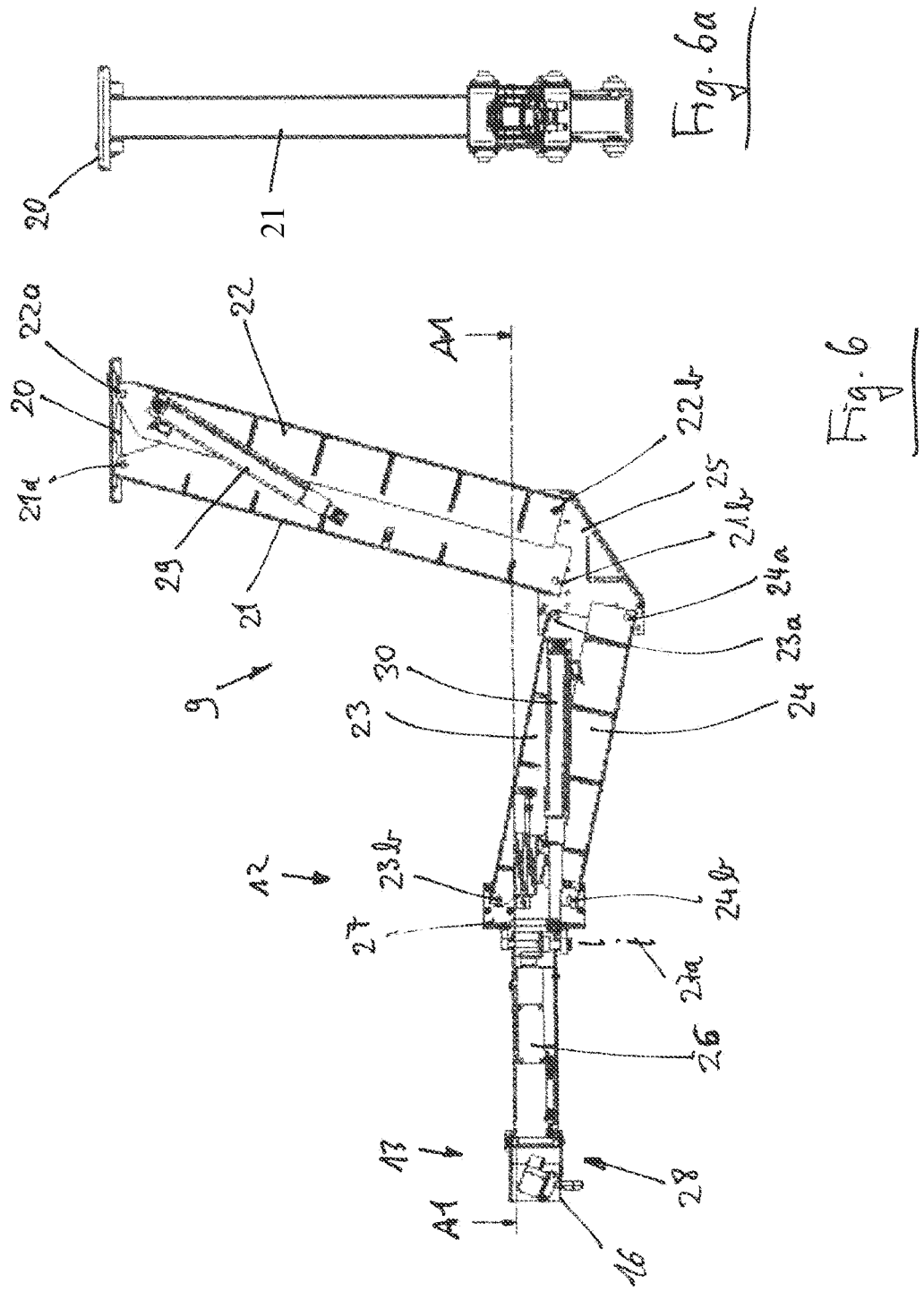
Figure 7:
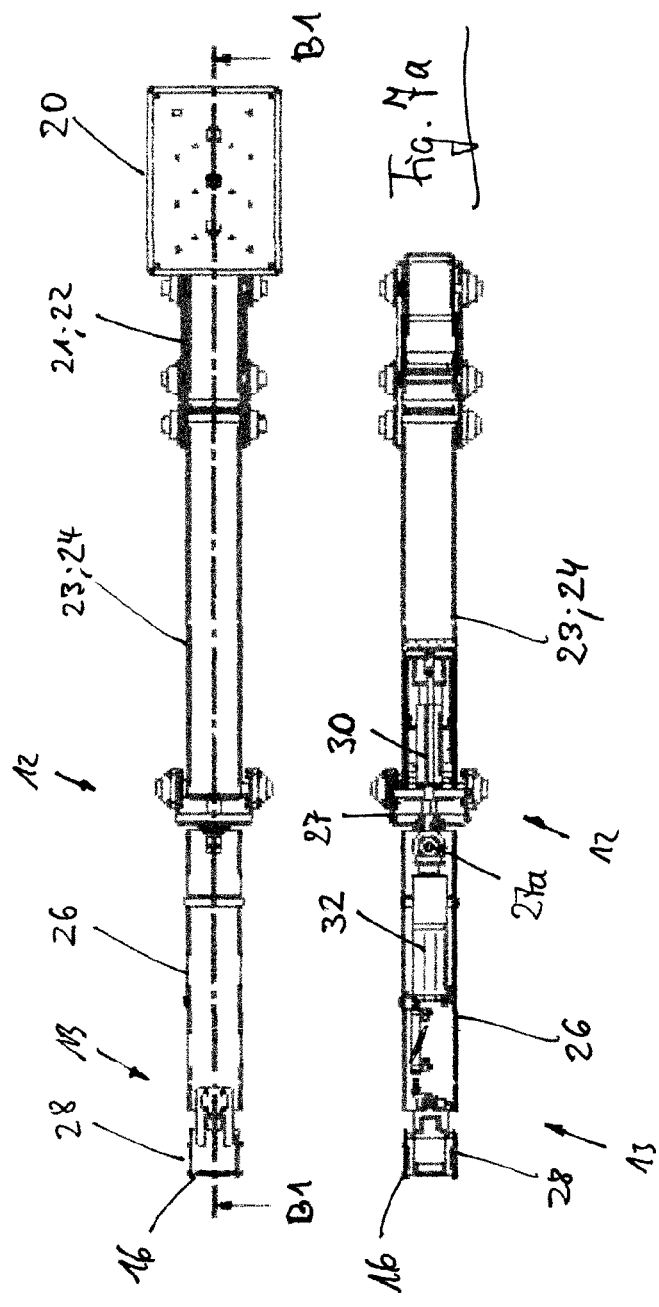

For further description of the robot arm 9, reference is made to FIGS. 5, 6-6a and 7-7a. FIG. 5 provides a schematic diagram of an inner robot device. FIG. 6 shows a longitudinal sectional view of an exemplary embodiment of the robot arm 9, FIG. 6a providing a front view. FIG. 7 provides a sectional view along the line of intersection A1-A1 from FIG. 6 of the robot arm 9, and FIG. 7a shows a sectional view along the line of intersection B1-B1 according to FIG. 7.

It can clearly be seen in FIG. 5 that the robot arm 9 is arranged on the head narrow side of the at least one milking parlor 3 of the milking parlor arrangement 1 for adjusting the arm device 6 (see FIG. 1), said head narrow side being associated with the head end of the animals T to be milked.

The robot arm 9 comprises parallel guiding of its robot upper arm 21, 22 and of its robot lower arm 23, 24 over the angle 25 and the pivotable connection of the robot upper arm 21, 22 to the trolley 20, as well as the pivotable connection of the robot lower arm 23, 24 to the hand joint 27. The robot arm 9 is introduced radially on one side of the animal T to be milked into the radially extending space of the space divider 40 next to the animal T for taking hold of the milking cluster 5 on the arm device 6. In this case, the legs of the animal T are not touched. The positioning operation of the milking cluster 5 takes place from the side of the animal T, as a milker also does in the case of conventional milking by hand. This is consequently a normal operation without having to introduce any devices between the legs of the animal T along the longitudinal axis of the animal T.

In an advantageous realization, the robot arms 21, 22 and 23, 24 are realized as parallel guiding arms which are developed as U-shaped profiles. These form in a manner nested into one another in each case the housing for drives 29, 30 (see FIGS. 6 and 7). In this way, the robot arms 21, 22 and 23, 24 at the same time assume the function of parallel guiding and of a housing. As a result of the drives 29, 30, having such a casing, they are protected, on the one hand, from dirt and moisture, and, on the other hand, people and animals are protected from injuries, in particular from getting squeezed.

The robot upper arm 21, 22 comprises two elements 21, 22 which are arranged side by side and are pivotably fastened in each case by way of their upper ends to the trolley 20 in a trolley axis 21a, 22a. The lower ends of the robot upper arm 21, 22 are in each case pivotably hinged on an upper side of the angle 25 in an angular axis 21b, 22b. Said upper side is a leg of the angle 25 which is developed as a right-angled triangle.

The angle 25 can be viewed as a type of elbow joint. The robot lower arm 23, 24 with the ends of its two elements 23 and 24 is pivotably mounted in each case in an angular axis 23a, 24a on its radially outwardly arranged leg. The front ends of the robot lower arm 23, 24 are in each case pivotably hinged in a hand axis 23b, 24b on a hand joint 27. The hand portion 26 is pivotably fastened in the hand joint axis 27a on the hand joint 27. The radial outer end of the hand portion 26 carries a hand 28, by way of which it forms the gripping portion 13. The hand 28 is realized in corresponding manner for interaction with the arm device 6. The radial portion 12 of the robot arm 9 is formed by the lower arm 23, 24 and the hand portion 26.

The elements of the robot arm 21, 22 are coupled with an upper arm drive 29 which, for example, is a pneumatic cylinder, a hydraulic cylinder or an electric drive. In the same way, the elements of the robot lower arm 23, 24 are coupled to a lower arm drive 30 which, for example, can also be a pneumatic cylinder.

In the sectional view according to FIG. 7a, part of the lower arm drive 30 can be seen inside the robot lower arm 23, 24 in the region of the hand joint 27. On the other, in this case left-hand, side of the hand joint 27, a pivot drive is arranged inside the hand portion 26 which carries out pivoting of the hand portion 26 about the hand joint axis 27a in relation to the robot lower arm 23, 24. A pivoted position is shown, for example, in FIG. 1. In addition, a gripping drive (not shown in any detail) which actuates the gripping portion 16 of the hand 28 for taking hold of and releasing the arm device 6, can be provided inside the hand portion 26.

The axes 21a-b, 22a-b, 23a-b, 24a-b are arranged in parallel and extend at right angles to the vertical or tangentially to the rotary milking parlor with the pivot point 2 (cf. FIG. 1). The axis 27 runs perpendicularly thereto and parallel to the vertical. The gripping portion 26 or the hand 28 can also be realized so as to be rotatable about its respective longitudinal axis.

Figure 8:
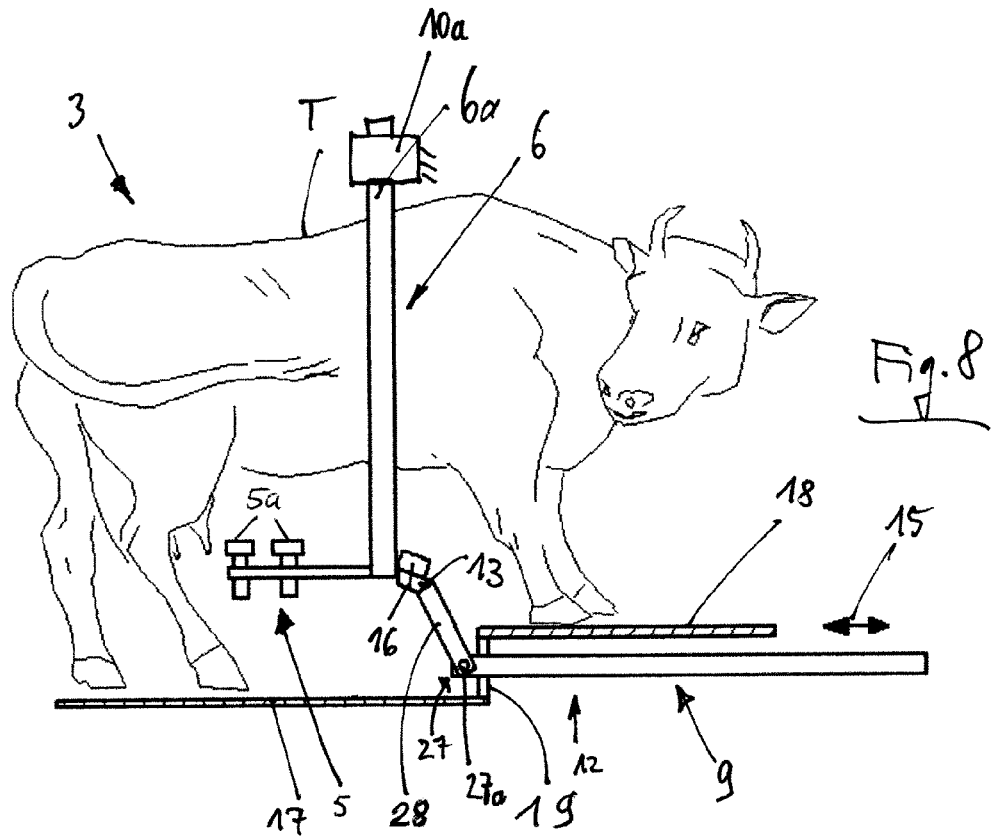
FIG. 8 shows a schematic diagram of a second exemplary embodiment of a milking parlor of the milking parlor arrangement according to the invention.
Figure 9:
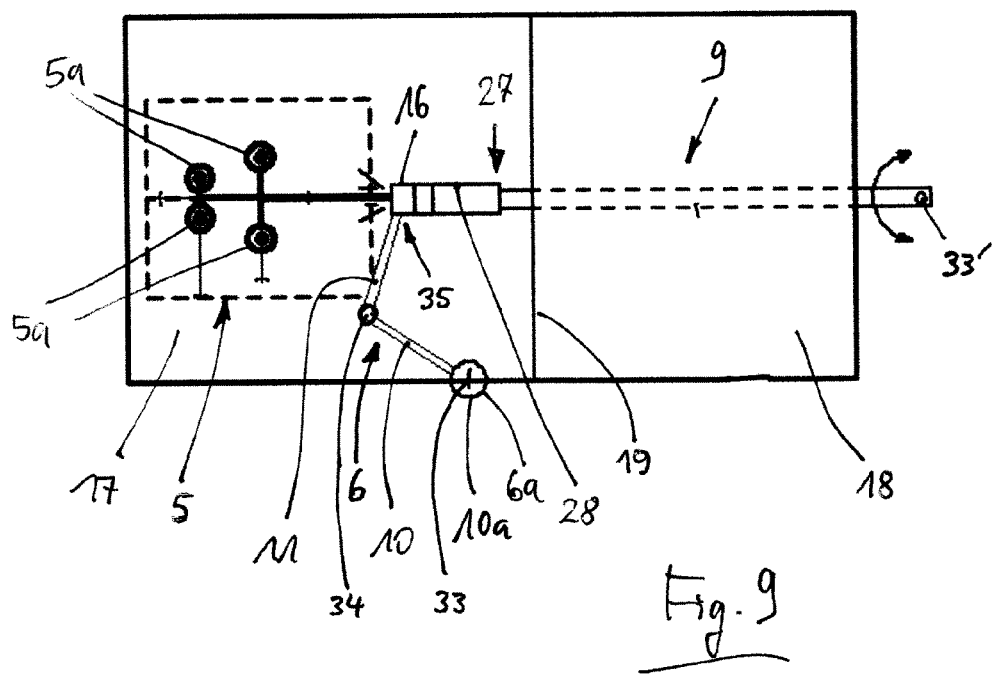
FIG. 9 shows a schematic top view of the milking parlor according to FIG. 8.

FIG. 8 shows a schematic diagram of a second exemplary embodiment of a milking parlor 3 of the milking parlor arrangement 1 according to the invention. FIG. 9, to this end, shows a schematic top view of the milking parlor 3 according to FIG. 8.

The difference between said variation and the above-described exemplary embodiment is that the floor of the milking parlor 3 is provided with a step 19. The step 19 separates the surface of the standing unit 17 from a front foot plate 18 which is at a greater height in relation to the standing unit 17. The front foot plate 18 is arranged pointing toward the interior IR of the milking parlor arrangement 1. I.e. the animal T to be milked stands with its hind hooves on the standing unit 17 and with its front hooves on the higher front foot plate 18. The step 19 is provided with an opening, through which the robot arm 9 can be passed in the radial direction 15 into the operating position shown in FIG. 8 in order to take hold of the arm device 6 with the milking cluster 5 and to adjust it into its operating position for positioning it on the udder of the animal T.

The radial portion 12 of the robot arm 9, in this case, is realized in a straight manner and at its end guides the hand 28 on the hand joint 27 through the opening of the step 19. The hand joint 27, in said exemplary embodiment, is pivotable either about an additional pitch axis or its longitudinal axis (in this case the hand joint axis 27a forms a pitch axis) in order to carry out a pitching movement which is indicated in FIG. 8. The robot arm 9 can also be pivotable about a further vertical axis 33' (see FIG. 9), for example, in the trolley 20, for which purpose a corresponding drive is provided.

FIG. 8 additionally shows in principle an arrangement of the bearing unit 10a of the arm device 6 above the animal T, for example on the radial outer end of the horizontal strut 4a of the rail carrier 4 according to FIG. 4. A vertical shaft 6a, which is guided in the bearing unit 10a so as to be pivotable about the vertical axis 33 and displaceable along the vertical axis 33, is shown in this case. Other types of attachment are obviously possible, for example on the or through the standing unit 17, the vertical shaft 6 extending through the standing unit 17.

The lower end of the vertical shaft 6a is coupled with the arm device 6, here with an end of the upper arm 10. The arm device 6 is pivotable about the vertical axis 33 by means of the vertical shaft 6a. The upper arm 10 is pivotably connected to the lower arm 11 in an intermediate axis 34. The milking cluster 5 is pivotably connected in a carrier axis 35 on the lower arm 11, at the end thereof which lies opposite the pivotable connection to the upper arm 10. The milking cluster 5, in said exemplary embodiment, comprises four teat cups 5a. Each of the four teat cups 5a is able to be positioned individually independently of the others.

The robot arm 9 is provided additionally with a positioning sensor 16 which is realized, in this case, as an optical sensor. By way of the positioning sensor 16, the milking cluster 5 with the arm device 6 is adjusted out of the park position into the operating position by means of the robot arm 9.

The milking cluster 5 is able to assume different positions in the operating position. A positioning position serves the purpose, for example, of positioning the teat cups 5a such that they are able to be suspended in each case onto a corresponding teat of an animal to be milked. During the milking operation, the arm device 6 supports the milking cluster 5 in such a manner that the weight of the milking cluster does not impair the milking operation. Once the milking has been completed, the teat cups 5a are released from the udder of the milked animal again and moved into the park position.

Control of the movements of the robot arms 9 and positioning of the milking cluster 5 is effected by means of a control device which is not shown here. The control device is connected to the positioning sensor 16 and to the respective drives and sensors of the robot arms 9.

Parallel guiding of the milking cluster 5 can be realized by way of push rods by means of a fixed connection to intermediate joints between the milking cluster 5 and the arm device 6. The parallelism can be varied, for example, by means of corresponding adjustments.

The invention is not restricted to the exemplary embodiments shown above but is modifiable within the framework of the accompanying claims.

It is possible for the rail 14 to form, for example, a segment of a semi-circle, a segment of a quarter circle of the segment of the semi-circle including the robot arms 9 for the positioning within the positioning region α, and the other segment of a quarter circle, which is arranged next to it in the anti-clockwise direction, comprising further robot arms 9 for removing and resetting the arm device 6 with the milking cluster 5 into the park position.

The positioning sensor 16, in an extension, can also supply, for example, images concerning the state of the udder of the animal to be milked and can consequently contribute to the knowledge of the state of health of the animal to be milked.

Each milking parlor 3 can be activated or blocked per se. It is possible to continue operating the milking parlor arrangement 1 even when milking parlors 3 are blocked, for example it is not necessary to stop the rotary milking parlor.

Each milking parlor 3 can be individually prepared for an animal, e.g. pre-defined operating position of the milking cluster 5 with the arm device 6, the corresponding pre-positioning data, depending on the animal that is 'recognized' by a recognition device when it enters the milking parlor 3, being made available from a data bank of the control device of the respective robot arm 9.

In addition, each milking parlor 3 can have a feed device.

The milking parlor arrangement 1 as a rotary milking parlor can be realized such that several 360° rotations for one milking operation of a certain animal can also be effected if this is necessary. In this case, an animal is prevented from leaving the milking parlor 3 when it arrives at the exit 8.

The arm device 6 can comprise pulling means, for example chains, toothed belts and the like, for example inside the upper arm 10 and lower arm 11 or in a combination with, for example, push rods which bring about parallel guiding and form movement damping.

The milking cluster can naturally also be used for milk-producing animals with udders which have a different number of teats, for example 2, 3 or 4.

Thus, it is conceivable for the milking parlor arrangement 1 to comprise several milking parlors 3 arranged side by side. In this case, the rail 14 is not circular but is adapted to the arrangement of the milking parlors 3, for example, straight.

In the variation according to FIGS. 8 and 9, the robot arm 9 can be positioned both at the side of the animal T through the opening and below the front hooves in the longitudinal axis of the animal T, i.e. the radial direction 15 of the robot arm 9 extends centrally below the animal T, the milking cluster 5 is moved and positioned to the left or right of the animal T from the respective side region between the front and hind legs of the animal T in its center under the udder. In this case, the robot arm 9 is not in the field of vision of the animal T.

The arm device 6 with the milking cluster 5 can comprise additional overload protection, for example as a result of parallel guiding with belts which can yield to kicks of an animal T.

It is also conceivable for the milking cluster 5 to be positioned in a semi-automatic mode by the simple actuator (not shown) mounted on the space divider 40, for example with chains or cables, pre-positioning the milking cluster 5 into a position, for example without a positioning sensor 16, under the udder of the animal T to be milked, the teat cups 5a being positioned by the milker. As a result, the strength of the milker is necessary only to position the teat cups 5a, not for the entire milking cluster 5 (positioning and lifting).

LIST OF REFERENCES

1 Milking parlor arrangement
2 Pivot point
3 Milking parlor
4 Rail carrier
4a Horizontal strut
4b Vertical strut
4c Cross connector
5 Milking cluster
5a Teat cup
6 Arm device
6a Vertical shaft
7 Entry
8 Exit
9 Robot arm
10 Upper arm
10a Bearing unit
11 Lower arm
12 Radial portion
13 Gripping portion
14 Rail
15 Radial direction
16 Positioning sensor
17 Standing unit
18 Front foot plate
19 Step
20 Trolley
21, 22 Robot upper arm
21a, 22a Trolley axis
21b, 22b Angular axis
23, 24 Robot lower arm
23a, 24a Angular axis
23b, 24b Hand axis
25, 25' Angle
26 Hand portion
27 Hand joint
27a Hand joint axis
28 Hand
29 Upper arm drive
30 Lower arm drive
31 —omitted—
32 Pivot drive
33, 33' Vertical axis
34 Intermediate axis
35 Carrier axis
40 Space divider
α Positioning region
IR Interior
T Animal

The invention claimed is:

1. A milking parlor arrangement comprising:
   a milking parlor for milking milk-producing animals, wherein the milking parlor is at least partially defined by two longitudinal sides, a head narrow end, and a hind quarter narrow end, and the head narrow end is associated with the head end of an animal to be milked;
   a spacer divider disposed adjacent to one of the two longitudinal sides;
   a robot arm extending into the milking parlor in a longitudinal direction from the head narrow end of the milking parlor;
   a bearing unit mounted at least partially inside the space divider and spaced apart from the robot arm; and
   an arm device operatively engaged with the bearing unit for rotatable and vertical movement, and operatively engaged with the robot arm for movement between a park position adjacent to the space divider and an operating position.

2. The milking parlor arrangement of claim 1, and further comprising:
   a controller for automatically adjusting the robot arm to adjust the arm device between the park position and the operating position.

3. The milking parlor arrangement of claim 1, wherein the milking parlor arrangement defines a positioning region, and the milking parlor arrangement further comprises:
   a rail disposed at least partially in the positioning region and the robot arm is movable along the rail within the positioning region.

4. The milking parlor arrangement of claim 3, wherein the milking parlor arrangement is a rotary milking parlor and further comprising:
   a pivot point about which the rotary milking parlor rotates, and the rail is curved and disposed substantially concentric with the pivot point.

5. The milking parlor arrangement of claim 3, wherein the rail is joined to the milking parlor arrangement.

6. The milking parlor arrangement of claim 3, wherein the robot arm is movable on the rail synchronously with a movement of the milking parlor arrangement.

7. The milking parlor arrangement of claim 3, wherein the milking parlor arrangement is a straight arrangement milking parlor, and the rail is substantially parallel with the milking parlor arrangement.

8. The milking parlor arrangement of claim 3, wherein the robot arm is movable on the rail independently of any movement of the milking parlor arrangement.

9. The milking parlor arrangement of claim 1, wherein the robot arm is adjustable in a radial direction of the milking parlor arrangement for adjusting the arm device between the park position and the operating position.

10. The milking parlor arrangement of claim 1, wherein the milking parlor comprises:
    a dairy animal standing unit; and
    a dairy animal front foot plate vertically separated from the dairy animal standing unit by a step.

11. The milking parlor arrangement of claim 10 wherein the longitudinal direction is a radial direction of the milking parlor.

12. The milking parlor arrangement of claim 1, wherein the arm device is arranged in the park position at least partially in the space divider.

13. The milking parlor arrangement of claim 1, wherein the arm device comprises:
an upper arm; and
a lower arm pivotably coupled to the upper arm.

14. The milking parlor arrangement of claim 1, wherein the bearing unit is disposed above an animal position.

15. The milking parlor arrangement of claim 1, wherein the arm device in the park position is disposed in an opening of the space divider.

16. The milking parlor arrangement of claim 15, and further comprising:
a protective covering disposed over the opening of the space divider.

17. The milking parlor arrangement of claim 1, and further comprising:
a milking cluster cleaning device arranged in the space divider.

18. The milking parlor arrangement of claim 1, wherein the arm device comprises:
an overload protection device.

19. The milking parlor arrangement of claim 1, and further comprising:
a parallel milking cluster guide.

20. The milking parlor arrangement of claim 1, and further comprising:
a parallel milking cluster guide having a plurality of rods.

21. The milking parlor arrangement of claim 20, wherein the parallel milking cluster guide includes a tensioning belt.

22. The milking parlor arrangement of claim 21, wherein the parallel milking cluster guide forms at least a portion of an arm device overload protection device.

23. The milking parlor arrangement of claim 1, wherein the robot arm comprises a positioning sensor.

24. The milking parlor arrangement of claim 1, wherein the arm device operating position is a fixed pre-determined position to enable access to a milking cluster.

25. The milking parlor arrangement of claim 1, wherein the bearing unit is disposed above a standing unit of the milking parlor.

26. The milking parlor arrangement of claim 1, and further comprising:
a standing unit, and the bearing unit is disposed above the standing unit of the milking parlor.

27. The milking parlor arrangement of claim 1, wherein the arm device comprises:
an upper arm operatively engaged with the bearing unit; and
a lower arm pivotably coupled to the upper arm and operatively engaged with the robot arm.

28. The milking parlor arrangement of claim 1, wherein the arm device comprises:
an upper arm limited to rotatable and vertical movement by the bearing unit; and
a lower arm pivotably coupled to the upper arm and disposed for movement in the milking parlor.

29. The milking parlor arrangement of claim 1, wherein the arm device comprises:
an upper arm limited to rotatable and vertical movement by the bearing unit; and
a lower arm pivotably coupled to the upper arm at a position that is vertically and horizontally spaced apart from the bearing unit, and disposed for movement in the milking parlor.

30. The milking parlor arrangement of claim 1, wherein the arm device comprises:
an upper arm limited to rotatable and vertical movement by the bearing unit; and
a lower arm pivotably coupled to the upper arm at a position that is vertically spaced apart from the bearing unit, and disposed for movement within the milking parlor.

31. The milking parlor arrangement of claim 1, wherein the arm device comprises:
an upper arm limited to rotatable and vertical movement by the bearing unit; and
a lower arm pivotably coupled to the upper arm at a position that is vertically spaced apart from the bearing unit, and the lower arm is disposed for horizontal movement.

32. A milking parlor arrangement comprising:
a positioning region;
a rail disposed in the positioning region;
a milking parlor for milking milk-producing animals and disposed adjacent to the positioning region, wherein the milking parlor is at least partially defined by two longitudinal sides, a head narrow end, and a hind quarter narrow side, and the head narrow end is associated with the head end of an animal to be milked;
a robot arm arranged adjacent to the head narrow end of the milking parlor and movable along the rail within the positioning region and from the head narrow end in a longitudinal direction that is substantially parallel to the longitudinal sides; and
a plurality of additional robot arms disposed for movement on the rail.

33. A milking parlor arrangement comprising:
a milking parlor for milking milk-producing animals, wherein the milking parlor is at least partially defined by two longitudinal sides, a head narrow side, and a hind quarter narrow side, and the head narrow side is associated with the head end of an animal to be milked;
a spacer divider disposed adjacent to one of the two longitudinal sides;
a robot arm extending into the milking parlor from the head narrow side of the milking parlor;
a bearing unit mounted at least partially inside the space divider and spaced apart from the robot arm; and
an arm device operatively engaged with the bearing unit for rotatable and vertical movement, and operatively engaged with the robot arm for movement between a park position adjacent to the space divider and an operating position;
a dairy animal standing unit
a dairy animal front foot plate vertically separated from the dairy animal standing unit by a step; and
wherein the robot arm is adjustable in a radial direction of the milking parlor through an opening in the step.

* * * * *